United States Patent
Rando

[19]

[11] Patent Number: 5,872,657
[45] Date of Patent: Feb. 16, 1999

US005872657A

[54] CONSTRUCTION LASER ACCESSORY FOR GENERATING ALIGNED SPOTS

[75] Inventor: Joseph F. Rando, Los Altos Hills, Calif.

[73] Assignee: LeveLite Technology, Inc., Mt. View, Calif.

[21] Appl. No.: 655,986

[22] Filed: May 31, 1996

[51] Int. Cl.⁶ .............................. G02B 27/14; G01C 3/00; G01C 5/00
[52] U.S. Cl. .............................. 359/629; 33/286; 33/290; 33/291
[58] Field of Search .............................. 259/629; 356/348, 356/399, 149, 250, 138, 339; 33/286, 290, 291, DIG. 21

[56] References Cited

U.S. PATENT DOCUMENTS

| | | | |
|---|---|---|---|
| 3,279,070 | 10/1966 | Blount et al. | 33/46 |
| 3,528,748 | 9/1970 | Burch et al. | 33/DIG. 21 |
| 3,801,205 | 4/1974 | Eggenschwyler | 356/138 |
| 3,897,637 | 8/1975 | Genho | 33/227 |
| 4,221,483 | 9/1980 | Rando | 356/250 |
| 4,374,365 | 2/1983 | Kilcy | 372/92 |
| 4,589,738 | 5/1986 | Ozaki | 350/443 |
| 4,679,937 | 7/1987 | Cain et al. | 356/138 |
| 4,852,265 | 8/1989 | Rando et al. | 33/227 |
| 4,993,161 | 2/1991 | Borkovitz | 33/291 |
| 5,283,694 | 2/1994 | Frady | 359/719 |
| 5,459,932 | 10/1995 | Rando et al. | 33/291 |
| 5,467,193 | 11/1995 | Laewen et al. | 356/399 |
| 5,500,524 | 3/1996 | Rando | 250/216 |
| 5,524,352 | 6/1996 | Rando et al. | 33/291 |
| 5,539,990 | 7/1996 | Le | 33/283 |
| 5,606,802 | 3/1997 | Ogawa | 33/276 |
| 5,610,711 | 3/1997 | Rando | 356/247 |
| 5,617,202 | 4/1997 | Rando | 356/138 |
| 5,619,802 | 4/1997 | Rando et al. | 33/291 |
| 5,621,975 | 4/1997 | Rando | 33/227 |
| 5,644,850 | 7/1997 | Costales | 33/282 |
| 5,666,736 | 9/1997 | Wen | 33/291 |
| 5,724,744 | 3/1998 | Bozzo | 33/291 |

*Primary Examiner*—Georgia Y. Epps
*Assistant Examiner*—Ricky Mack
*Attorney, Agent, or Firm*—Thomas M. Freiburger

[57] ABSTRACT

Accessories are disclosed for use with a laser tool which may or may not be self-leveling. The accessories include one or more diffraction elements, effective to receive the incoming beam and produce a plane of diverging laser beams. In preferred embodiments the diffraction elements are self-leveling. When the diverging beams are directed against a surface such as a floor, wall or ceiling, a series of discrete spots define a visible reference line useful in construction layout. The spots themselves may each locate the position of a fastener to be installed, for example, by giving the approximately correct spacing for reference of the user. The generation of discrete spots rather than a solid line, as would be generated by a cylindrical lens, better allocates laser power by providing brighter, more visible reference elements on the wall or ceiling.

29 Claims, 15 Drawing Sheets

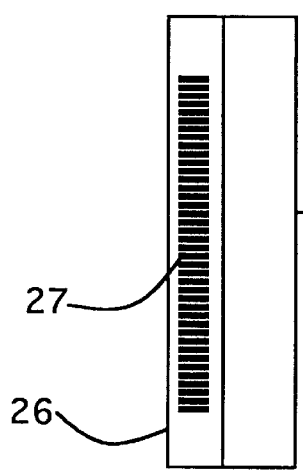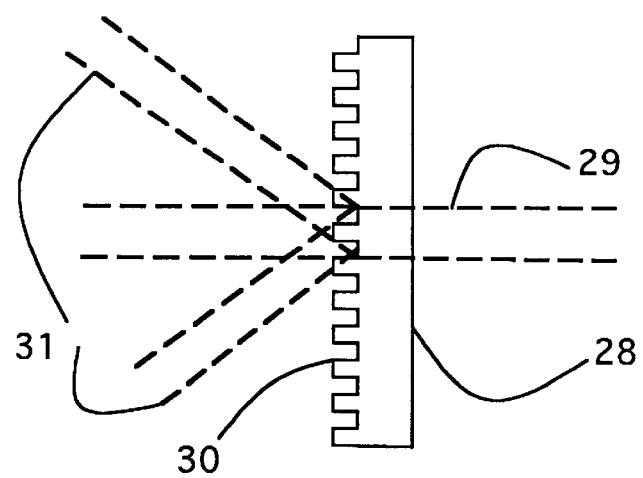
Fig. 3          Fig. 4
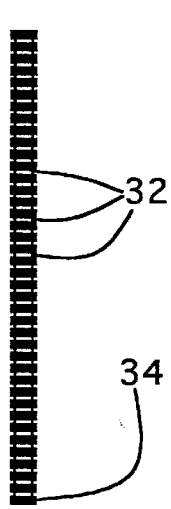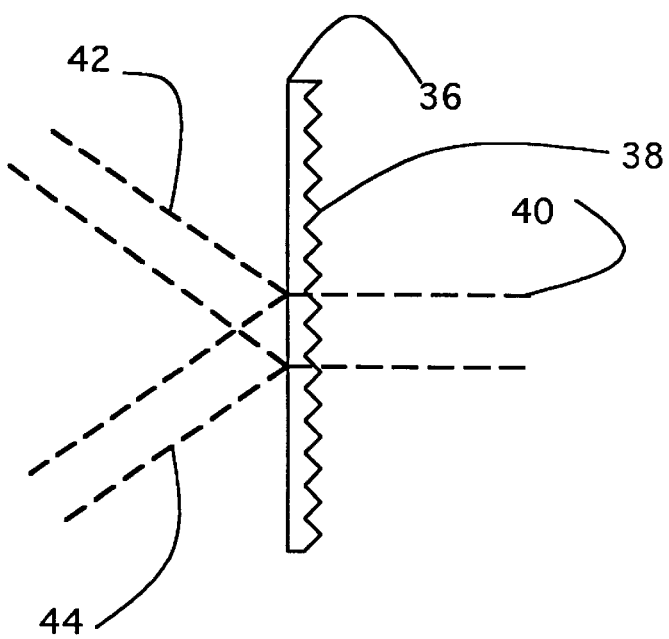
Fig. 5          Fig. 6

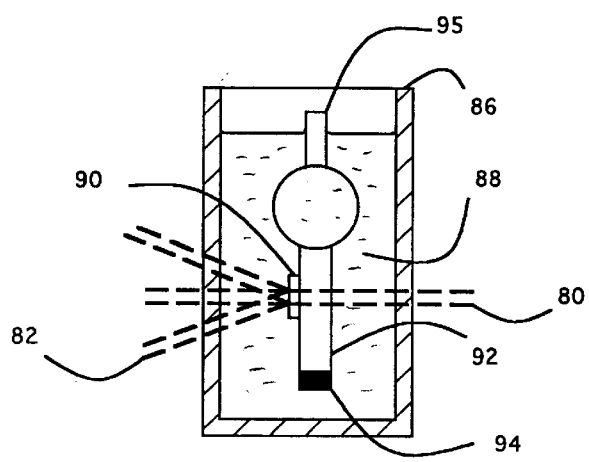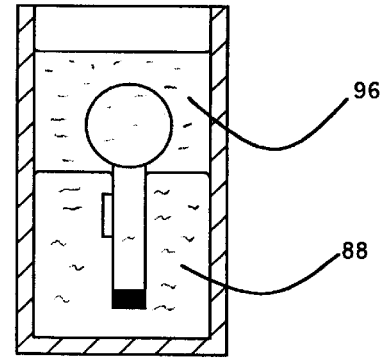
Fig. 13
Fig. 14

CONSTRUCTION LASER ACCESSORY FOR GENERATING ALIGNED SPOTS

REFERENCE TO DISCLOSURE DOCUMENT

The subject matter of this invention was described in part in Disclosure Document No. 397,200, filed Apr. 22, 1996.

BACKGROUND AND SUMMARY OF THE INVENTION

This invention relates to hand tools, and in particular the invention is concerned with a compact hand tool for projecting plumb, level, and square reference beams of visible light for precise alignment.

The use of such a tool has been limited to the ability of the operator to see the projected spot or line in daylight. In cases where the laser beam is used to produce a reference spot all the energy is concentrated in the spot. This spot is visible because its brightness is higher than the background. In cases where a reference line is needed, a cylinder lens is often used to spread the beam to generate a line. Because of the resulting lower intensity, the line is difficult to see.

The invention creates a reference line using an array of discrete spots via optical diffraction. An objective of the invention is to use an array of discrete spots to determine a more visible reference line. Another objective of the invention is to provide means to ensure that the reference lines are either plumb, level or providing a 90 degree reference through the use of self-leveling pendulums. The invention is particularly useful when it includes a self-leveling laser instrument, allowing transfer of a point to a line of spots on a wall, at the same height as the point; and allowing transfer of a floor point to a ceiling, the array of projected spots being directly above the floor point, in a common vertical plane with the floor point.

A variety of survey and carpentry tools have previously employed lasers. The first laser alignment tools were manually leveled as in U.S. Pat. Nos. 3,897,637 and 3,279,070. When a beam has been used to form a reference line, a cylinder lens has been commonly used. Other means for generating a line are described in U.S. Pat. Nos. 5,283,694 and 4,589,738. Such a laser instrument, shown generally by 2 in FIG. 1, consists of a laser beam projector 4 producing a round beam 6 which is fanned out, spread, or expanded in one axis by a positive cylinder lens 8. A bubble level 10 is mounted parallel to the horizontal axis of the cylinder lens on an adjustable platform 12. A mounting frame allows the assembly to be leveled using a tangent screw 14, the laser 4 being leveled along with the platform 12. With this apparatus a horizontal line of laser light may be projected onto a surface from a level beam of light.

In FIG. 2 the apparatus of FIG. 1 produces a horizontal line 18 on the wall 20. Note that the cylindrical lens apparatus is hidden from view by the laser beam projector 4. There are several variations of this basic system in use which employ the same principles. For example, the beams may be diverging in the horizontal or vertical direction. A second orthogonally oriented level vial may be used, etc.

In contrast to the manually level laser instrument, self-leveling instruments using a rotary beam of light have been employed to improve accuracy and reliability. These typically generate a plane of light which is detected electronically. Such instruments have been described in U.S. Pat. Nos. 4,221,483 and 4,679,937. The use of a detector is required since the limited laser power is distributed over a large area. Such systems are expensive and inconvenient since the user must purchase an electronic detector and always have the electronic detector at hand. The present invention is attractive because no detector is required and a more inexpensive laser instrument may be used.

A low cost automatic self-leveling laser instrument is described in U.S. Pat. No. 5,459,932, assigned to the same assignee as the present invention. The disclosure of that patent is incorporated herein by reference. The present invention is used in conjunction with such a compact battery operated laser projector of the type described in the above mentioned patent as well as with some manually leveled laser instruments. Such a generic laser instrument can be considered as generally shown by 2 in FIG. 1.

Lasiris Inc. of Quebec, Canada, produces a laser tool for manually positioning spots of laser light used as reference in measuring, without any self-leveling ability. The spots are generated by diffraction of a laser beam.

The present invention achieves an efficient light distribution for construction alignment or layout by providing an array of discrete spots via optical diffraction, in a compact and cost effective arrangement. The level or plumb lines of laser spots, or a line of spots on a ceiling perpendicular to a reference line, can be used for locations of drilling holes, setting nails or screws, locating windows or doors, sawing lines, erecting moldings, or ledges or other operations wherein the projected arrays of spots are far easier to generate than would be the case with a plumb bob, measuring tape, carpenter's level used to transfer lines, etc. These and other objects, advantages and features of the invention will be apparent from the following description of preferred embodiments, considered along with the accompanying drawings.

DESCRIPTION OF THE DRAWINGS

FIG. 3 is an enlarged view of a thick photographic plate or hologram showing diffraction elements.

FIG. 4 is an enlarged side view of a diffracting element whose diffraction is caused by grooves in a transparent substrate.

FIG. 5 is an enlarged side view of a diffracting element whose diffraction is caused by an array of holes.

FIG. 6 is a side view of a lenticular prism array used to generate two beams at large angle to each other from a single input beam.

FIG. 13 is a side view of a self-leveling grating with a float and protrusion to minimize surface tension.

FIG. 14 is a side view of a self-leveling grating using two fluids to ensure the pendulum is fully submerged.

FIGS. 18 and 18A are partial section and plan views of a self-leveling grating with a bearing and a float containing two gratings.

DESCRIPTION OF PREFERRED EMBODIMENTS

Figure 1:
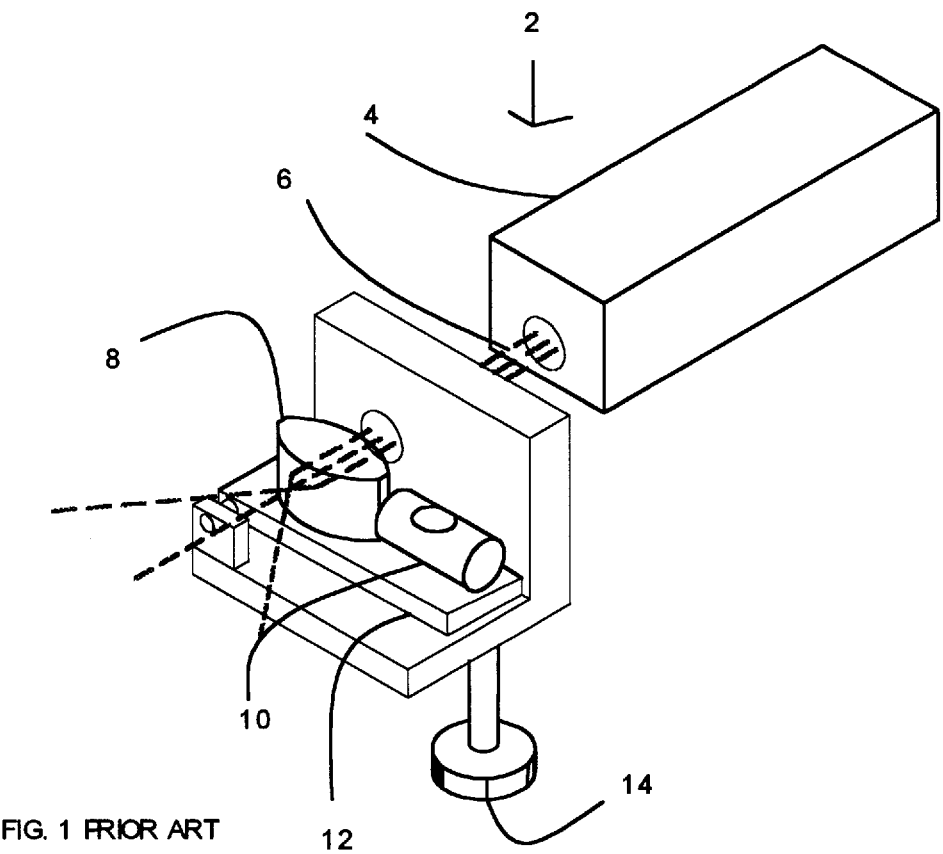
FIG. 1 is a perspective drawing of a laser beam projector and a beam spreading cylinder lens with adjustment means showing the prior art.

FIGS. 3 through 22 of the drawings show different diffraction elements which may be used with the invention and various embodiments of laser accessories according to the invention, for generating an array of discrete laser spots for use in layout and construction.

The principle of optical diffraction is well known. The ease of diffraction of coherent light beams is also well known and described in such texts as *Engineering Optics* by K. Lizuka published by Springer-Verlag. The diffracting elements are generally periodic arrays in one or two dimensions. FIG. 3 is a section view of a photographic plate 24 showing a thick, high resolution emulsion 26 with periodic regions of high and low refractive index 27. This type of element is generally called a hologram. Fabrication techniques are described in many references including that cited immediately above. A simple diffraction grating as required by this invention may be produced by allowing the plane waves of laser light to intersect within the photographic plate during exposure. The angle between the waves determines the grating spacing and the subsequent diffraction angle between the beams generated by a single beam passing through the hologram.

FIG. 4 is an edge view of a transparent substate 28 showing an alternate method of generating an array of diffracted spots. Equally spaced grooves 30 run into the page and are of equal dimensions and spacing. The input beam 29 is diffracted into a number of distinct beams 31.

In a like manner a periodic array of holes 32 in an opaque substate 34 of FIG. 5 generates a similar series of distinct spots in a plane from a single laser beam.

Although diffracting elements in FIGS. 3, 4 and 5 produce a number of distinct beams, the number of beams, their energy distribution, and the angle of diffraction are determined by their detail construction, as is known. The improvement in visibility of an array of spots generated by the means described above, compared to that generated by a cylinder lens, depends on the efficiency of the grating as well as the number of spots generated. The fundamental principle of this invention is that for a fixed laser beam power, the array of spots is more visible because the limited light is concentrated in a few spots instead of being distributed over a large area. Laser power of the instrument is limited by laser safety regulations and laser cost.

In order to have a long reference line to work with, it is desirable to have a wide divergence angle between the diffracted beams. This can be accomplished by using a lenticular prism array to create two beams with a wide angular separation before or after the diffracting element. Such an array is manufactured by Fresnell Optics Inc. of Boston. FIG. 6 shows a side view of such a prism array. A transparent substrate 36 has prism faces 38 which are small compared to the beam diameter. The input beam 40 is then divided into two beams 42 and 44. The angle between the two beams is determined by Snell's law. Diffraction plays a small role in this case because of the relatively wide prism spacing. The two arrays, of the lenticular prism and of the diffraction element, are in alignment to avoid diverging the beans along two axes which would increase the spot size and reduce visibility.

Figures 7, 7A:
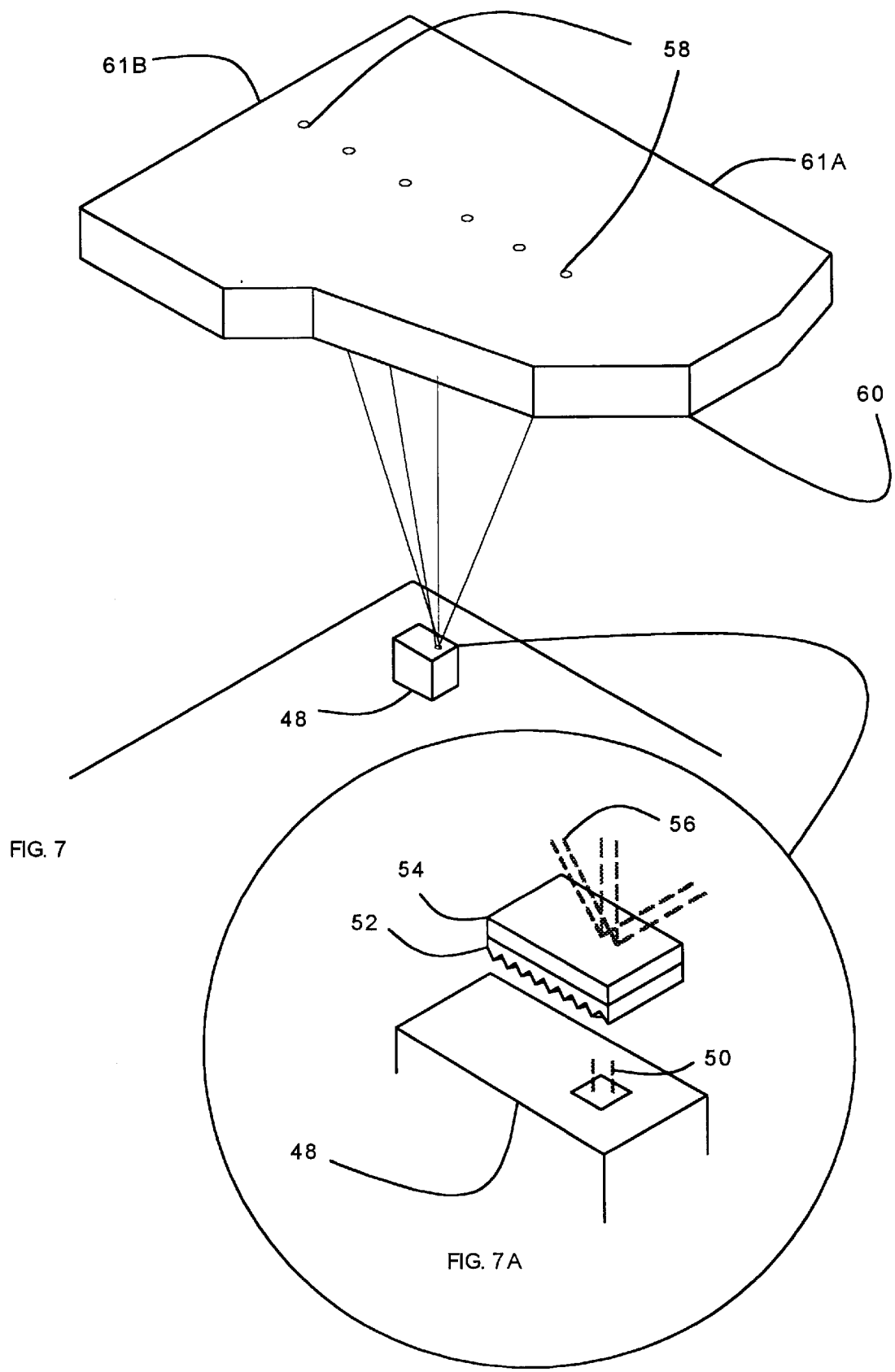
FIGS. 7, 7A and 7B are perspective views showing the use of a wide angle beam spreading method and the result on a ceiling or wall, the ceiling being translucent in FIG. 7 for purpose of illustration.
Figure 7B:
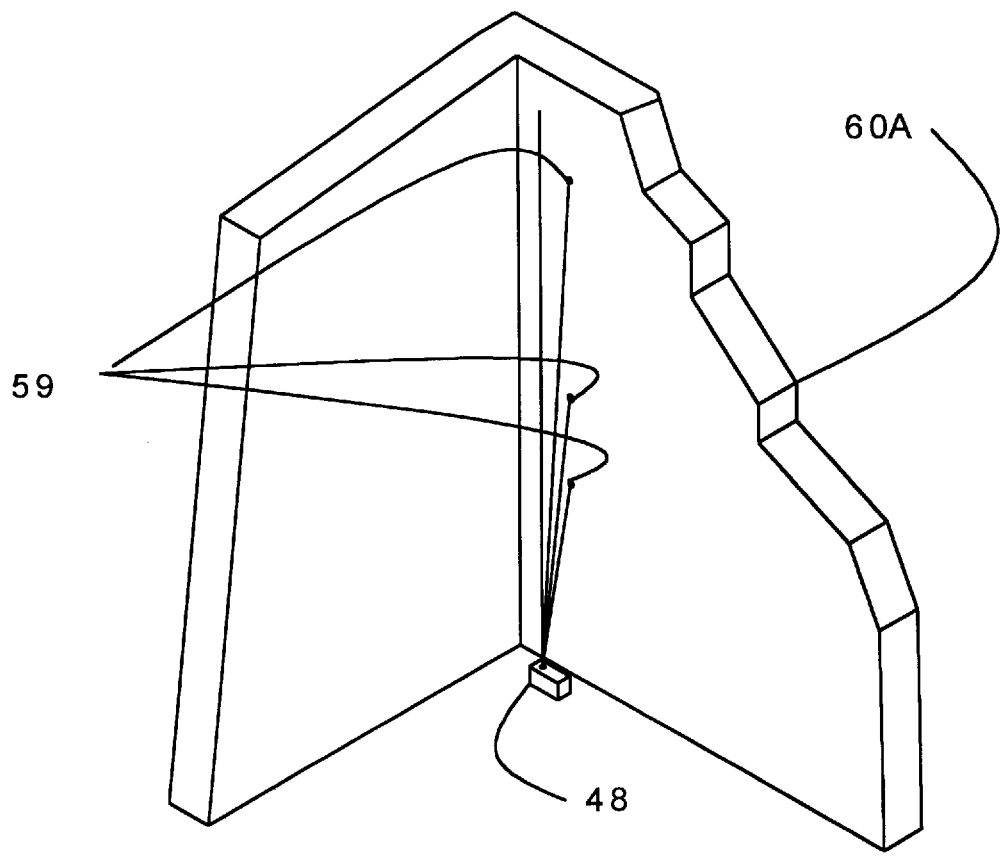

A laser instrument using this principle is shown in FIGS. 7, 7A and 7B. A laser beam projector 48 produces a plumb beam 50 which is first refracted by a lenticular prism array 52 (FIG. 7A) in contact with a holographic grating 54. The grating axis and the prism axis are parallel to each other. Spread beams 56 determine a line in a vertical plane and produce the spots 58 on the translucent ceiling 60. If the plane of the arrays 52 and 54 is out of the horizontal plane by more than a few degrees, the line formed by the spots on the ceiling is slightly curved. This is not a serious concern since such a rough degree of level is easy to obtain. This system is particularly useful when the laser beam is automatically plumb. With a substantially plumb beam 50 from the instrument 48, the linear array of spots 58 projected on the ceiling will be directly above the beam 50, i.e., in a substantially vertical plane which also includes the beam 50. The orientation of the array of spots 58, i.e., as parallel to an edge 61a of the ceiling all perpendicular to an edge 61b of the ceiling, must be achieved by proper rotational orientation of the diffraction grating or other diffraction element.

FIG. 7B shows that the array of spread beams, or part of the array, can be projected onto a vertical wall 60a as well as on the ceiling. FIG. 7B shows how projected beam spots 59 define a vertical line on the wall 60a. Such a vertical line is a useful construction reference. As is seen from FIG. 7B, the invention permits a linear array of spots to easily be located on a wall (and/or on the ceiling), without the need for use of a carpenter's level, tracing a line with the level, or use of a plumb bob. Such reference lines can be useful in laying out windows, doors, skylights, duct work, etc.

Figure 8:
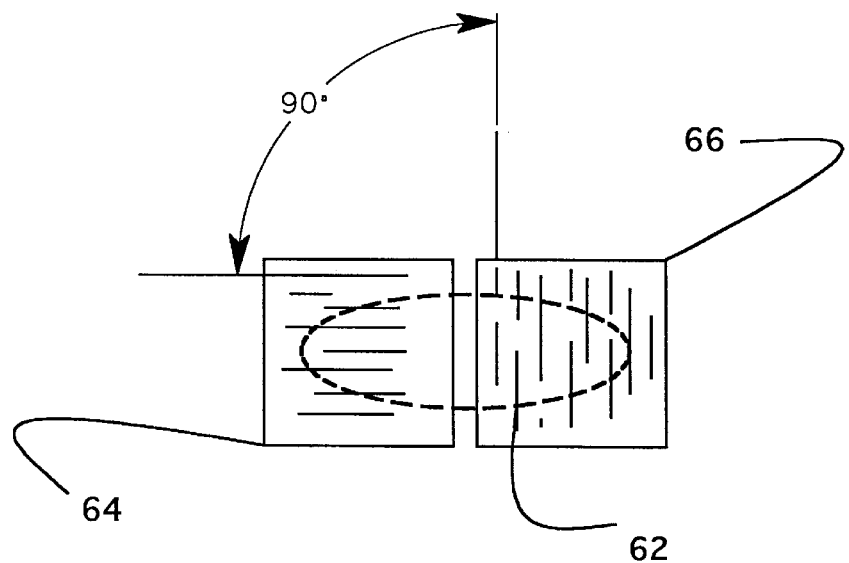
FIG. 8 is a plan view of two orthogonally oriented gratings showing the profile of the transmitted beams.

The utility of the diffracted beams in construction alignment may be further enhanced by using these methods to produce lines at 90 degrees to each other. This may be accomplished in several ways without requiring separate laser beams for each line. In the simplest case two grating elements with orthogonally oriented gratings are butted together as shown in FIG. 8. This arrangement allows part of the laser beam 62 to be diffracted by each grating element 64 and 66. Often such beams are fortunately elliptical, facilitating the division into two beams of nearly the same size. In this way it is possible to create two reference lines at 90 degrees to each other using diffraction and a single beam.

Figure 9:
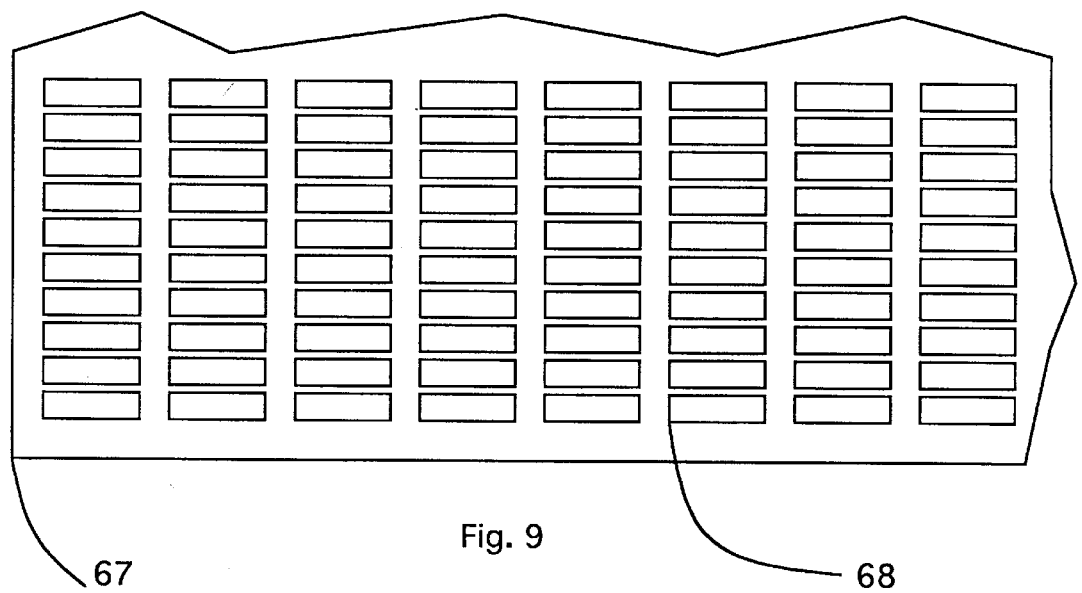
FIG. 9 is an enlarged plan view showing a two dimensional diffracting optical element.
Figure 10:
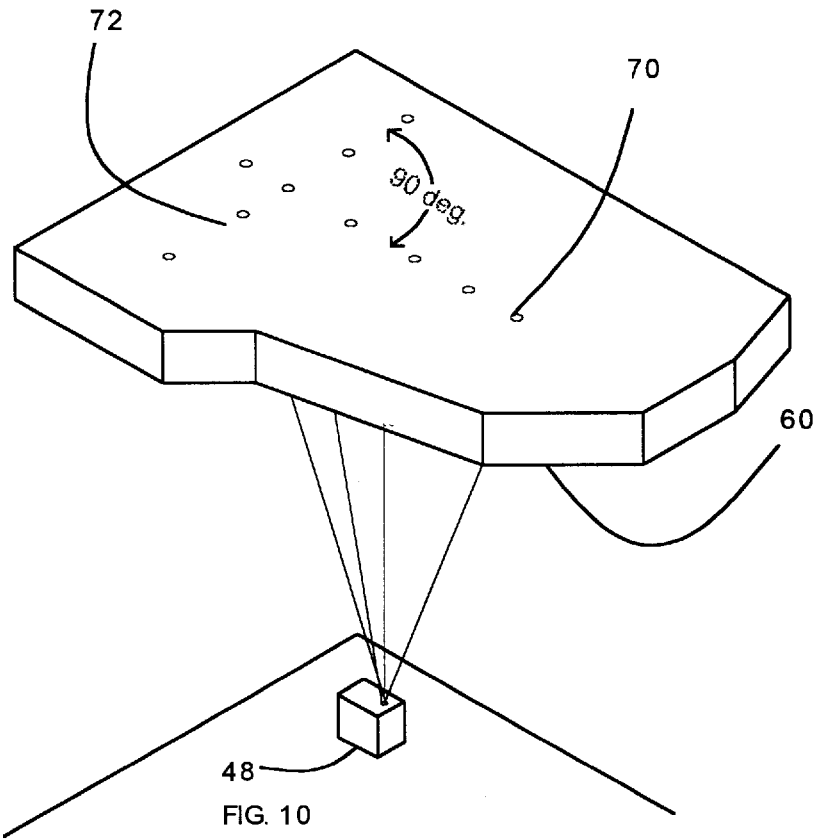
FIG. 10 is a perspective view showing the diffracted beam pattern from the diffraction element of FIG. 9 on a translucent ceiling.

In FIG. 9 the diffracting components of a grating are shown in the plane of the paper, enlarged. A substrate 67 can be transparent or opaque. Diffracting components 68 may be grooves in the substrate, holes in the substrate, or refractive index variations in the volume of a transparent substrate.

Such a two dimensional array will diffract the beam into a two dimensional array of spots. By choosing the size of the diffractive components 68 and their spacing, the energy may be concentrated in one line of spots with a few spots indicating the 90 degree lines. Such distribution is showing in FIG. 10. The primary line of spots 70 is perpendicular to the secondary line of spots 72. The intensity of the spots 72 is low in order that the higher order diffracted spots in this axis are very low power to avoid confusion resulting from too many spots. Although these spots are shown on the ceiling, this method could be used to generate a horizontal and vertical line from a nominally horizontal beam.

Figure 2:
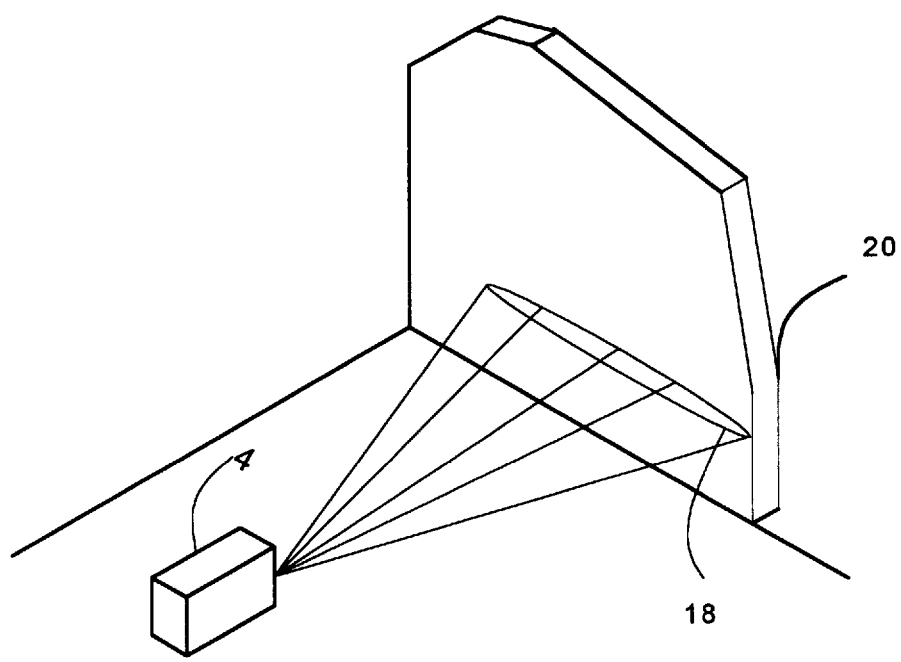
FIG. 2 is a perspective view of the horizontal beam produced by the apparatus of FIG. 1, following prior art.
Figure 11:
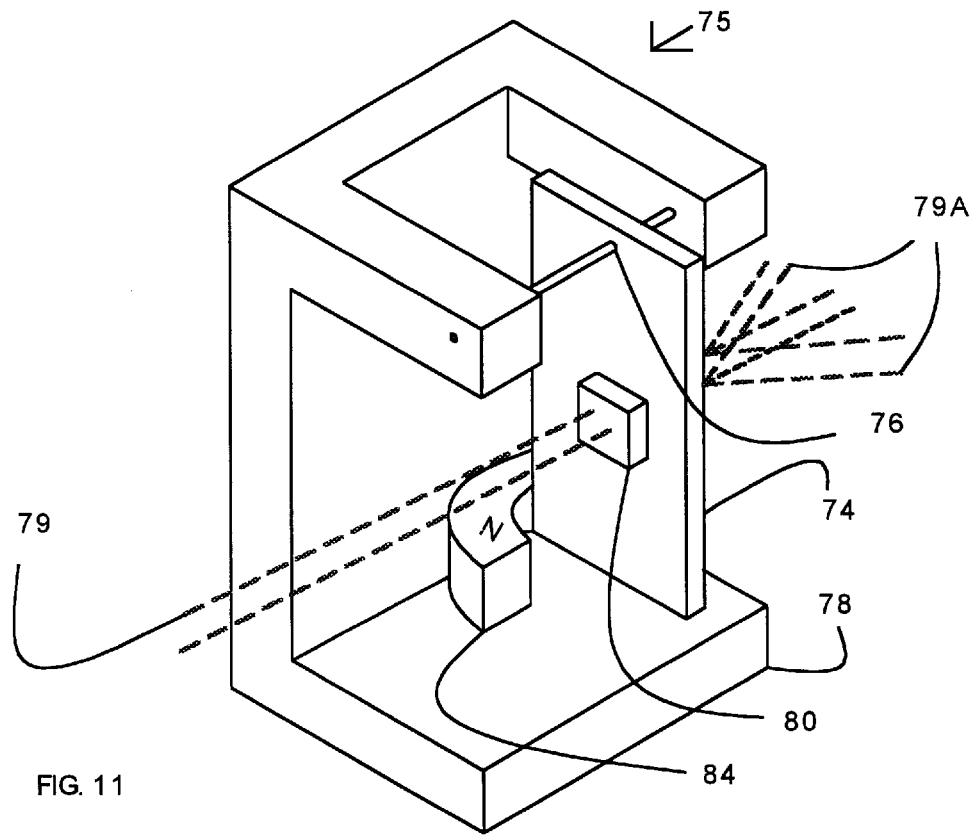
FIG. 11 is a perspective view showing a pendulous self-leveling grating with magnetic damping.

In order to produce a horizontal reference line on a wall, as is often needed in construction alignment, and as is shown in the prior art view of FIG. 2, the platform holding the cylinder lens or diffraction grating must be adjusted to level. This is time consuming. Several embodiments of the invention use self-leveling means for adjusting the beam spreading elements automatically to level or plumb. These methods are applicable to refractive, reflective or diffractive beam spreading techniques. A pendulous self-leveling system is shown in FIG. 11, indicated generally by 75. A copper or aluminum pendulum 74 is hung from a low friction bearing 76 in a frame 78. A laser beam 79 is diffracted or refracted into divergent horizontal beams 79a by an optical element 80. A magnet 84 damps the oscillations.

Figure 12:
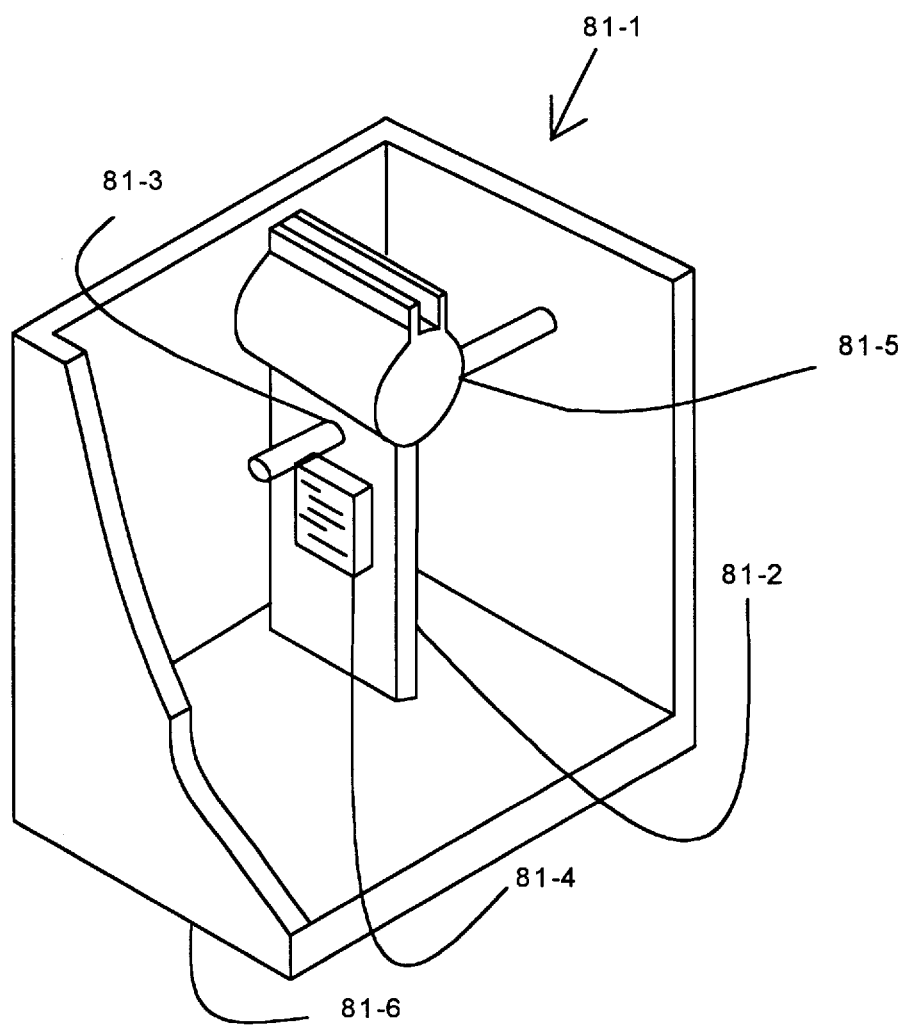
FIG. 12 is a perspective view showing a pendulous self-leveling grating with float and oil damping.

A pendulous system in FIG. 12 is indicated generally by 81-1. The pendulum 81-2 is pivoted near the middle on a bearing 81-3 and supports a beam spreading element 81-4 near the bottom, as well as a float 81-5. The transparent vessel 81-6 within which these components are supported is filled with a transparent damping fluid such as oil, not shown in the figure. The center of gravity of the pendulum is below the pivot while the center of buoyancy is above the pivot. In this arrangement the pendulum is self-leveling through the action of gravity. The friction at the bearing diminishes as the average density of the pendulum approaches that of the fluid. The self-leveling beam spreading device 81-1 is used in the same way as the device 75 of FIG. 11.

Alternate methods of achieving a self-leveling platform using flotation are shown in FIGS. 13 and 14 where like numbers correspond to like elements. A chamber 86 contains a transparent damping fluid 88 in which a beam diverging element 90 is mounted on a transparent float 92. A weight 94 orients the float so as to always maintain the same orientation relative to gravity according to well known principles of buoyancy. The float 92 has a protrusion 95 which minimizes the effect of surface tension by confining it to a small region far from the walls of the chamber. The weight and volume of the float are controlled to ensure that all but the protrusion is below the surface of the fluid.

In FIG. 14 a second, less dense fluid 96 is used in conjunction with a dense fluid 88. In this case the float is always submerged as the float seeks its own level, avoiding the adverse effects of surface tension. The input and diffracted beams in FIGS. 13 and 14, not shown, are the same as those in FIG. 11.

Figure 15:
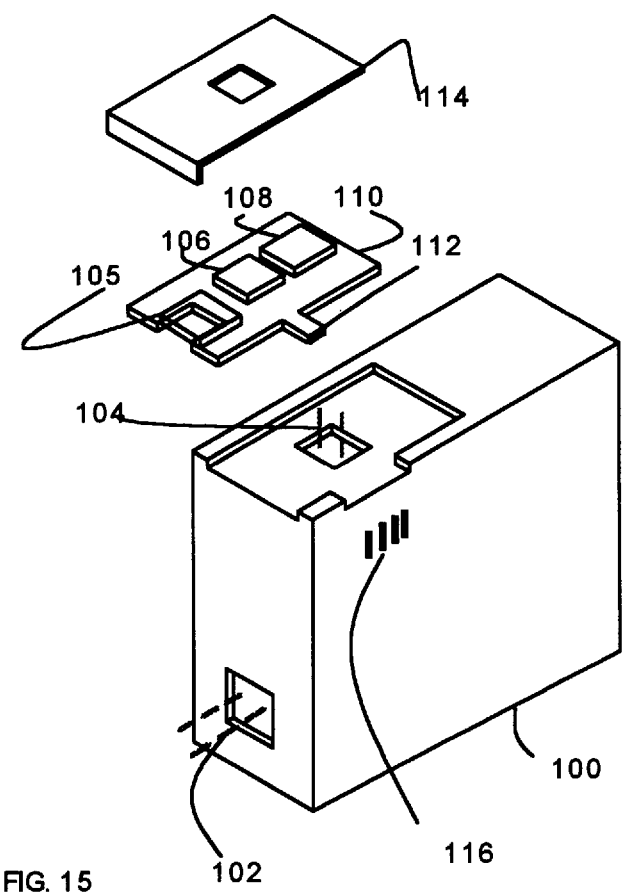
FIG. 15 is an exploded view of a compact battery operated laser projector with selectable diffraction gratings.

A compact battery operated laser beam projector as described in U.S. Pat. No. 5,459,932 is shown in FIG. 15 and is indicated by 100. A level laser beam 102 and a plumb laser beam 104 are produced by the instrument. The optical-mechanical mechanism inside steers the beams in the level and plumb directions even though the housing is not level. Two diffraction elements 106 and 108 are mounted on a sliding member 110 mounted at the top of the laser instrument. They may be sufficiently close to each other to allow a portion of the beam to pass through each grating, generally as illustrated in FIG. 8. A power equalizing filter 105 may be used to ensure that the power transmitted at each position of the sliding member does not exceed an allowed maximum. The sliding member fits in the housing and may be slid from side to side via an extending lever 112 by the operator as needed to select the beam spreading function desired. The sliding member is contained by a cover 114. Four positions of the sliding member are indicated on the housing by marks 116. In the first position the beam passes through the power equalizing filter 105, reducing the power to that allowed by laser safety. In the second position the beam is diffracted by the diffraction element 106 (preferably a grating) while in the fourth position the beam passes through the diffraction element or grating 108. In the third position the slide member is positioned so that part of the beam passes through each of the diffraction elements 106 and 108. Although diffraction gratings have been mentioned, the slide could contain cylinder lenses for the same purposes.

A similar slide with beam spreading means can also be used on the level beam 102 of FIG. 15. Such an arrangement would allow the operator to select reference lines which are parallel or perpendicular to the axes of the case.

Figure 16:
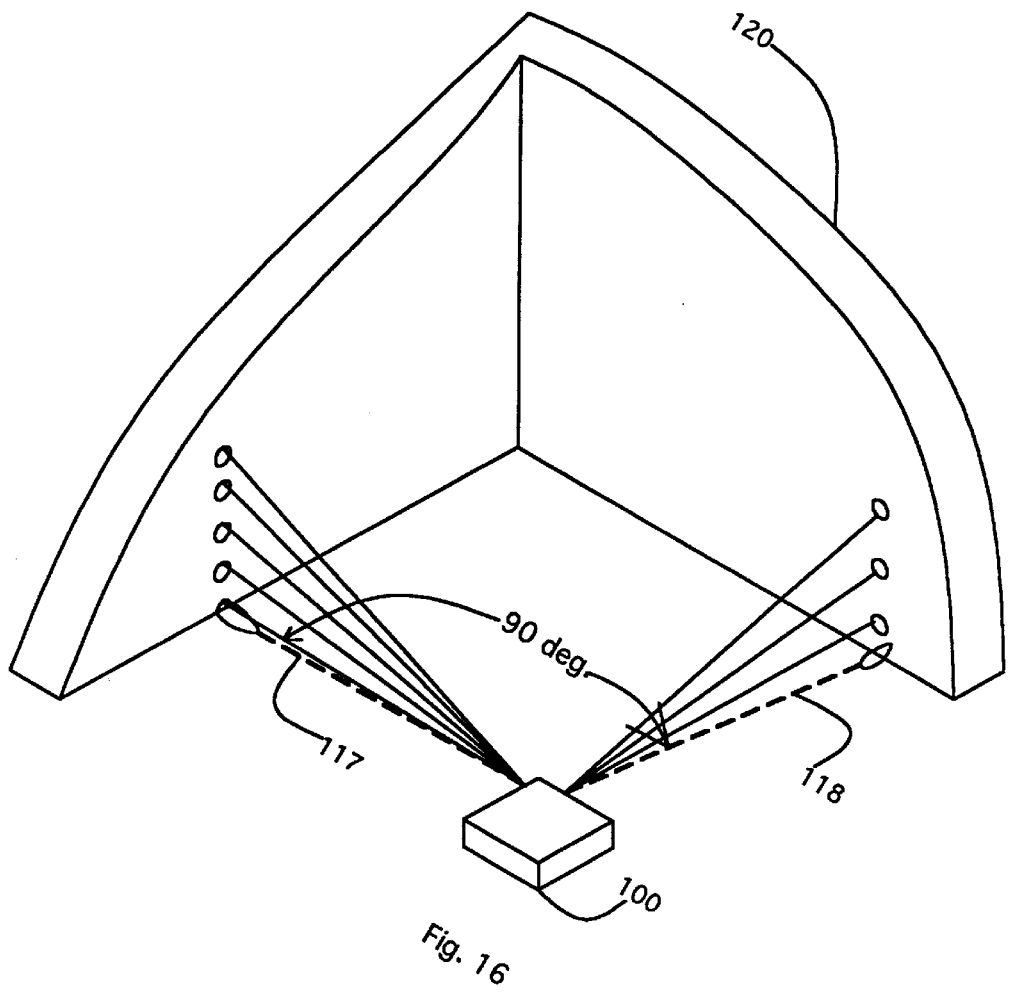
FIG. 16 is a perspective view of a compact battery operated laser projector with two diffraction elements in place to diffract reference beams defining a 90 degree corner.

FIG. 16 shows how the gratings may be used to lay out a 90 degree corner for a particular selection of gratings using the laser projector on its side. Because of the beam divergence of the gratings, spots 117 and 118 are visible on the floor as well as on the walls 120.

Figure 17:
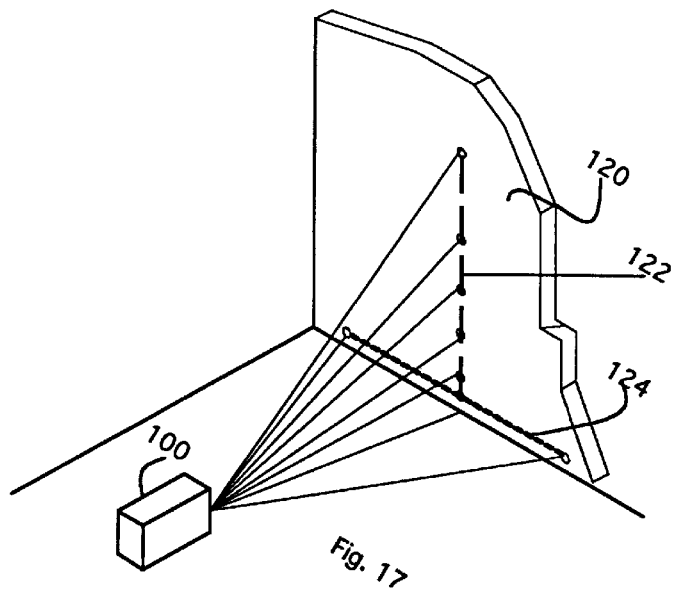
FIG. 17 is a perspective view of two-dimensionally diffracted beam from a self-leveling grating against a vertical wall.

FIG. 17 shows how the gratings may be used to project a simultaneous horizontal and vertical line. The line of spots 124 is level while the line of spots 122 is vertical, useful for laying out a window, door, etc. The beam passes through two adjacent gratings as in FIG. 8. In this case the gratings must be oriented in the horizontal and vertical directions. This need to accurately orient the grating is eliminated if means for automatically leveling the gratings are provided as described herein.

Figure 18:
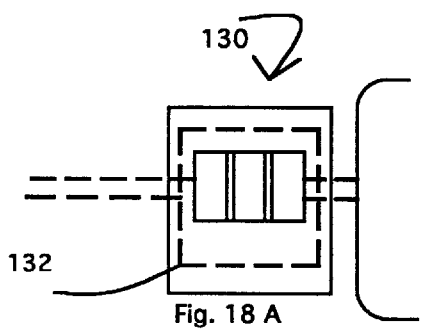

FIGS. 18 and 18A show side and top views of a grating self-leveling system generally indicated by 130. A vessel 132 is filled with a transparent damping fluid 134 such as oil. A bearing 136 (which preferably acts on two axes) provides a two axis pivot for a pendulum/float frame 138. The frame has an air filled region 140 for providing a buoyant force. Gratings 142 and 144 are mounted on the pendulum/float with their optical axes at 90 degrees to each other. The gratings are typically on glass and provide weight to the bottom of the pendulum/float. An input light beam 146 originates from a laser beam projector 148 and subsequently diffracts into beams 147 to produce a vertical array of spots. The top view of FIG. 18A shows the edge of the plane of beam spreading and the extent of the vessel 132. For clarity, the mounting of the vessel is not shown in the figures. A mounting which allows the vessel to be raised and lowered in the beam would allow selection of vertical spreading, horizontal spreading or over lapping horizontal and vertical spreading of the beam.

Figure 19A:
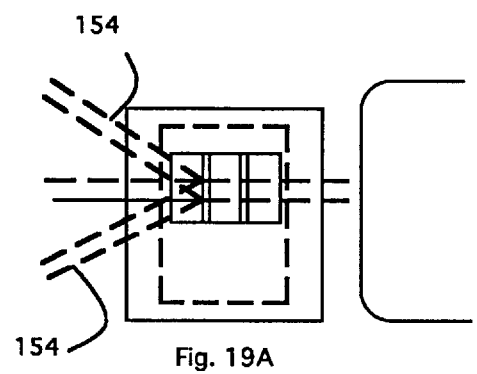
FIGS. 19 and 19A are partial section and plan views of a self-leveling grating with two liquids of different density with the housing tilted to show the self-leveling.
Figure 18:
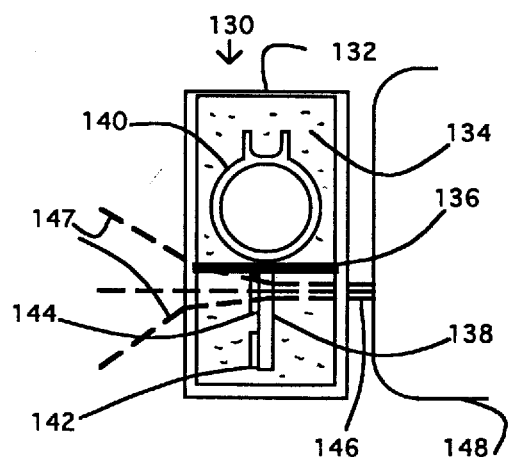
Figure 19:
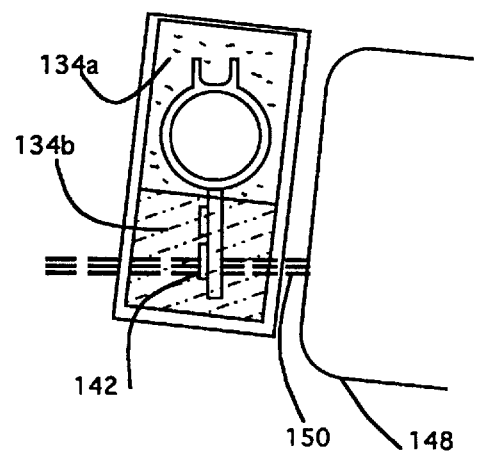
Figure 19B:
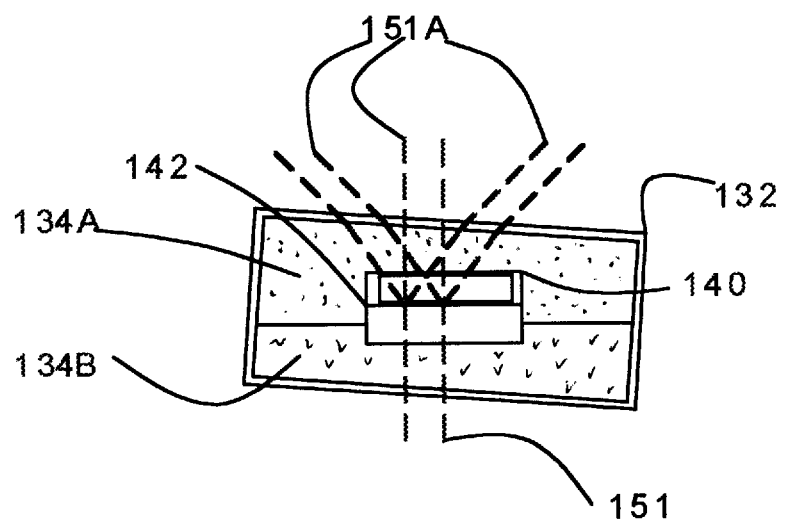
FIG. 19B is a schematic sectional elevation view of a self-leveling grating wherein the grating is horizontal and floats between two liquids of different density.

In FIGS. 19 and 19A the laser projector 148 is shown generating a self-leveled horizontal beam 150. The grating 142 which produces a horizontal series of beams 154 is selected by raising the assembly up so that the beam passes through the horizontal grating 142. In FIG. 19 the assembly is shown as a float in two liquids, without a bearing as in FIG. 18, to achieve the self-leveling function. In FIG. 19B the grating 142 is positioned in the horizontal plane with a transparent float 140a and liquids 134a and 134b of different density. A plumb beam 151 is diffracted by the grating 142, and the self-leveling feature of the grating assures the plane of diverging beams 151a will remain in a plane with the plumb beam 151.

Figures 20, 21:
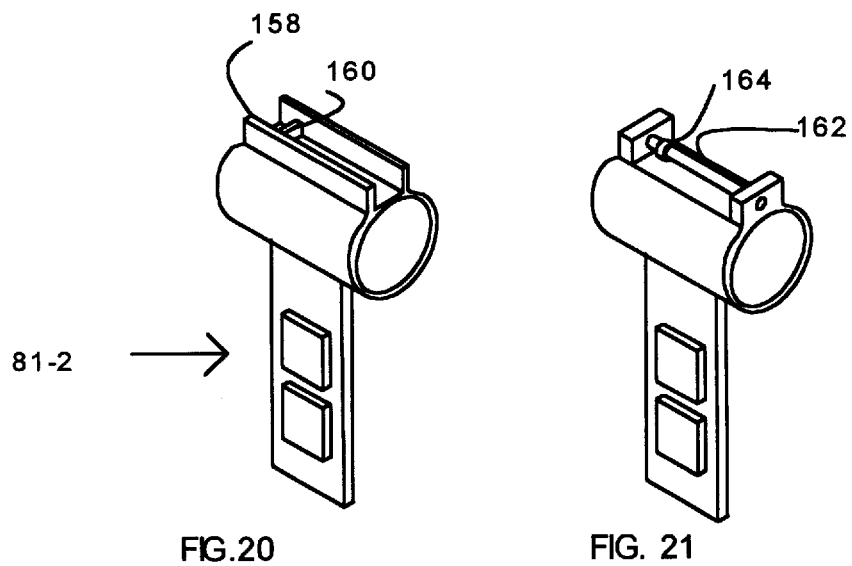
FIG. 20 is a perspective view of the float/pendulum of FIG. 18 showing a detail for factory calibration using weight changes.
FIG. 21 is a perspective view of the float self-leveling grating of FIG. 19 showing a method of factory calibration using a moving nut.

In all of the beam spreading, self-leveling systems described, an adjustment in manufacturing must be provided in order that the optical axis of the optical element may be set to horizontal or vertical. FIG. 20 shows how this may be done in practice. The float/pendulum of FIG. 12 is shown again without the vessel and pivot detail. The vertical axis of the float may be shifted by moving a weight on the pendulum or by adding or subtracting weight. A trough 158 on the top of the pendulum/float 81-2 can be used to contain a sliding weight 160 which is fastened in place by cement. This adjustment may also be made by removing weights like the weight 160 from the trough. A threaded rod 162 as shown in FIG. 21 can carry a nut 164. The adjustment is then made by screwing the tightly fitting nut 164 along the shaft 162.

Figure 22:
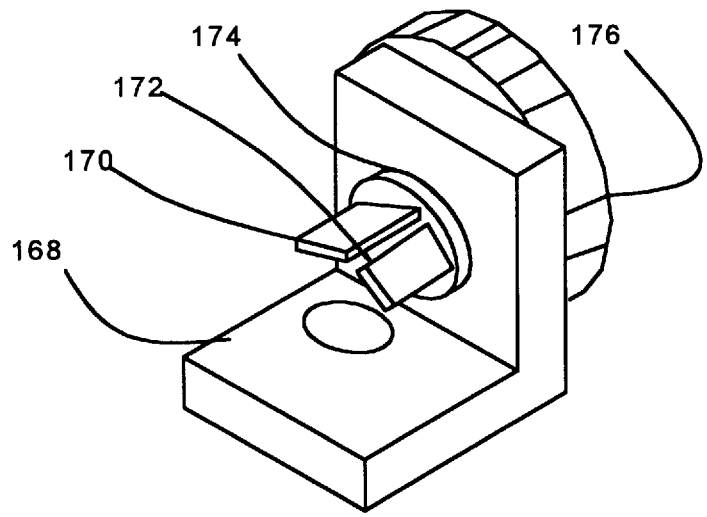
FIG. 22 is a perspective view showing a multiple grating holder of the invention for allowing selection of one of two gratings and the adjustment of the effective grating spacing and spacing of the resulting laser.

In construction alignment it is often necessary to place fasteners or other building elements at an approximately uniform spacing. In this regard the utility of a diffraction grating equipped laser tool is further enhanced by providing a means for varying the effective grating spacing. The angular separation of the beams may be reduced by tipping according to a cosine relationship. In actual use the operator can set the first two fasteners in a row and subsequently tilt the grating until the spot spacing is equal to the fastener spacing. The location of the other spots is then indicated by the diffracted spots. The effective spacing range can be increased by using gratings of different spacing. FIG. 22 shows apparatus for adjusting the grating spacing. A bracket 168 has a bearing 174. Gratings 170 and 172 are selected by rotating a knob 176. Rotation also varies the effective grating spacing. For example, by making one grating spacing 70 percent of the other, and by moving from beam-normal position on the first grating to a 45°-angled position on the second grating, a two to one difference in effective spacing can be achieved.

Figure 23:
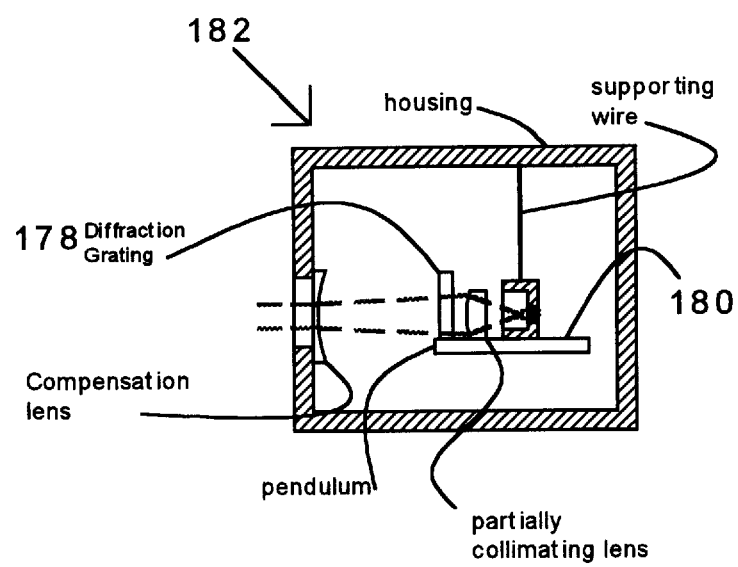
FIG. 23 is a schematic side elevation view in section showing a self-leveling laser instrument with an internal diffraction element.

Although several of the above embodiments show self-leveling diffraction elements as separate accessories for use with a laser tool, the diffraction element can be located inside a self-leveling laser instrument such as shown in U.S. Pat. No. 5,459,932 (incorporated herein by reference). The diffraction element 178 can be located directly on the pendulum platform 180 in such an instrument 182 as indicated schematically in FIG. 23. This assures that the line of light spots produced by the instrument will be level or plumb or orthogonal relative to the tool position. A diffraction element can be located on platforms of two-beam embodiments shown in the referenced patent, such that one or both beams are divided into diverging beams. Exit windows and lenses can be sized as needed.

The above described preferred embodiment is intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method used in construction layout for producing and using an array of laser beam spots on a floor, ceiling, wall or other flat surface, the array of spots being in a line which is substantially level or plumb, comprising:

generating a visible laser beam with a laser instrument, directing the laser beam through an accessory separate from the laser instrument, having diffraction element with means for dividing the beam into a plurality of discrete, diverging beams within a plane, the accessory having self-leveling means for maintaining the diffraction element in level or plumb orientation, and directing the array of discrete, diverging beams against a surface, with the array of beam spots substantially level or plumb on said surface, and using the resulting array of laser beam spots on said surface as a reference in a construction procedure.

2. The method of claim 1, wherein the step of generating a laser beam comprises producing a substantially level beam using a self-leveling laser instrument which generates a substantially level beam despite a small tilt of the instrument, and including projecting a line of laser beam spots on a wall or other flat structure, said line being located substantially in a horizontal plane which contains the substantially level laser beam as generated by the instrument.

3. The method of claim 1, further including providing a plurality of diffraction elements with different orientations and a means for selecting the diffraction elements, and including selecting a diffraction element as desired to produce the array of beam spots desired.

4. The method of claim 3, wherein the plurality of diffraction elements are positioned closely together, and including selecting two adjacent diffraction elements by positioning the diffraction elements to each receive part of the laser beam so as to produce two different arrays of beam spots on said surface.

5. The method of claim 1, including providing a diffraction element having two axes of diffraction, and producing two different arrays of beam spots when the laser beam passes through the diffraction element.

6. The method of claim 5 wherein the laser beam is generated using a self-leveling laser instrument which produces a substantially level or plumb beam despite a small tilt angle of the instrument itself, such that at least one of the arrays of beam spots is aligned with the beam from the instrument in a common horizontal or vertical plane.

7. The method of claim 1, further including directing the beam through a lenticular prism array and thereby producing a wider divergence in the array of diverging laser beams.

8. The method of claim 7, wherein the lenticular prism array is positioned directly adjacent to the diffraction element, between the diffraction element and a source of the laser beam.

9. The method of claim 1, including producing beam spots on two surfaces at right angles to each other, by positioning the laser beam and diffraction element so as to produce some of the spots on one surface and some of the spots on the other.

10. The method of claim 1, wherein the self-leveling means of the accessory comprises a housing containing liquid, a pendulum/float frame within the housing, having an average density essentially the same as the liquid and having a center of gravity toward a bottom end of the pendulum/ float frame, such that the pendulum/float frame tends to assume an upright position regardless of tilt of the housing, and the diffraction element being secured to the pendulum/float frame so as to produce a level or plumb array of beam spots as projected on a wall with the pendulum/float frame in the upright position.

11. The method of claim 10, further including, prior to directing the laser beam through the diffraction element, adjusting the pendulum/float frame by manipulation of a movable weight element so as to calibrate the self-leveling means.

12. A system for producing an array of aligned laser beam spots on a surface, the array being substantially level or plumb in orientation, comprising:
   a laser instrument with means for generating a laser beam,
   a separate accessory including beam diffraction means positioned in the path of the laser beam such that the beam passes through the beam diffraction means to produce a series of discrete, diverging laser beams substantially within a plane, the beam diffraction means including a diffraction element,
   the diffraction means including self-leveling means for retaining the diffraction element in substantially level or plumb orientation, whereby the plane of diverging beams produces a substantially level or plumb line of laser spots on a surface.

13. The system of claim 12, wherein the diffraction means comprises a hologram as said diffraction element.

14. The system of claim 12, wherein the diffraction means comprises a plurality of diffraction elements, each having a different grating orientation, and means for selecting among the diffraction elements.

15. The system of claim 12, wherein the diffraction element comprises two-axis means for producing from a laser beam two arrays of beam spots substantially in two intersecting planes.

16. The system of claim 12, wherein the diffraction means comprises a plurality of selectable diffraction elements arranged closely adjacent to one another as said diffraction element, and means for selecting among the diffraction elements, including means for positioning two adjacent elements across the laser beam such that a portion of the laser beam is received and diffracted by each of the two adjacent elements.

17. The system of claim 16, wherein the laser instrument comprises a self-leveling laser instrument with means for maintaining the laser beam substantially level despite a tilt angle of the laser instrument itself.

18. The system of claim 12, wherein the laser instrument comprises a self-leveling laser instrument with means for maintaining the laser beam substantially level despite a tilt angle of the laser instrument itself.

19. The system of claim 12, wherein the self-leveling means for retaining the diffraction element in substantially level or plumb orientation comprises a housing containing liquid, a pendulum/float frame within the housing, having an average density essentially the same as the liquid and having a center of gravity toward a bottom end of the pendulum/float frame, such that the pendulum/float frame tends to assume an upright position regardless of tilt of the housing, and the diffraction element being secured to the pendulum/float frame so as to produce a level or plumb array of beam spots as projected on a surface with the pendulum/float frame in the upright position.

20. The system of claim 19, further including adjustment means for calibration of the self-leveling means, said adjustment means comprising a movable weight element on the pendulum/float frame, adjustable in lateral position so as to assure that the pendulum/float frame assumes an accurately upright position.

21. The system of claim 19, wherein the housing contains two liquids of different densities, with a less dense liquid lying over a more dense liquid, the pendulum/float frame being completely submerged in the two liquids and being retained at a constant level within the liquid due to the different densities of the two liquids.

22. The system of claim wherein the beam dividing means comprises a plurality of different beam dividing means for producing different arrays of diverging beams, and means in the accessory for selecting among the different beam dividing means.

23. The system of claim 12, further including means on the diffraction means for adjusting the separation of the diverging laser beams.

24. The system of claim 23, wherein the separation adjustment means comprises means for rotating the diffraction element on an axis of rotation substantially perpendicular to the path of the laser beam.

25. The system of claim 24, including at least two diffraction elements, each having different grating spacings and the means for rotating including means for selecting among the at least two diffraction gratings as well as for adjusting the angle of a diffraction grating relative to the laser beam, by rotation about said axis.

26. A laser beam diffraction apparatus for producing an array of aligned laser beam spots on a surface, comprising:
   beam diffraction means positioned to receive a laser beam from a laser source, for producing from the laser beam a series of discrete, diverging laser beams substantially within a plane,
   self-leveling means on the beam diffraction means for retaining the beam diffraction means in substantially level or plumb orientation, whereby the diverging laser beams produce a substantially level or plumb line of laser spots on a surface, and
   means on the diffraction means for adjusting the separation of the diverging laser beams.

27. The apparatus of claim 26, wherein the beam diffraction means includes a housing and a diffraction element mounted in the housing, and the separation adjustment means comprising means for rotating the diffraction element on an axis of rotation substantially perpendicular to the path of a laser beam from said source.

28. The apparatus of claim 27, including at least two diffraction elements, each having different grating spacings and the means for rotating including means for selecting among the at least two diffraction gratings as well as for adjusting the angle of a diffraction grating relative to the laser beam, by rotation about said axis.

29. A system for producing an array of aligned laser beam spots on a surface, the array being substantially level or plumb in orientation, comprising:
   a laser instrument with means for generating a laser beam,
   a separate accessory positioned in the path of the laser beam and including beam dividing means for producing from said laser beam a series of discrete, diverging laser beams substantially within a plane,
   the separate accessory including self-leveling means for retaining the beam dividing means in substantially level or plumb orientation, whereby the plane of diverging beams produces a substantially level or plumb line of laser spots on a surface.

* * * * *